United States Patent [19]

Johne et al.

[11] 4,276,827
[45] Jul. 7, 1981

[54] OPERATOR SAFETY DEVICE

[75] Inventors: Hans Johne, Radebeul; Arndt Jentzsch, Coswig; Lothar Schmidt, Radebeul; Wolfgang Müller; Mandred Funke, both of Coswig, all of German Democratic Rep.

[73] Assignee: Veb Polygraph Leipzig Kombinat für Polygraphische Maschinen und Ausrüstungen, Leipzig, German Democratic Rep.

[21] Appl. No.: 17,139

[22] Filed: Mar. 5, 1979

[30] Foreign Application Priority Data

Mar. 16, 1978 [DD] German Democratic Rep. ... 204213

[51] Int. Cl.³ .............................................. B41F 5/00
[52] U.S. Cl. ................................. 101/212; 200/61.69
[58] Field of Search .................... 101/177, 183.4, 212, 101/216, 217; 200/50 A, 47, 61.41, 61.42, 61.69, 61.7; 400/54; 192/129 R, 129 A, 129 B, 135

[56] References Cited

U.S. PATENT DOCUMENTS

| | | | |
|---|---|---|---|
| 2,568,002 | 9/1951 | Hart et al. | 400/54 |
| 3,151,224 | 9/1964 | Colucci | 200/61.69 X |
| 3,209,634 | 10/1965 | Daniels | 192/129 X |
| 3,428,766 | 2/1969 | Kauffman | 200/61.69 |
| 3,543,905 | 12/1970 | Albrile | 400/54 |
| 3,780,242 | 12/1973 | Bendro | 200/61.42 X |
| 3,881,077 | 4/1975 | Piber | 200/61.69 |
| 3,899,062 | 8/1975 | Ward | 192/129 R |
| 4,002,869 | 1/1977 | Tacetta et al. | 200/61.7 |

Primary Examiner—Edward M. Coven
Attorney, Agent, or Firm—Michael J. Striker

[57] ABSTRACT

An operator safety device includes a plurality of covers for covering parts of a machine to protect an operator against contact with these parts when the machine is in operation. At least some of the covers are movable between a closed position where the covers do not cover these parts and the latter are readily accessible and constitute a danger of accidents. A switch is operable for shutting down the machine when at least one of the covers moves from the closed into the open position. A linkage connects the covers with the switch for actuating the latter whenever at least one of the covers moves from the closed into the open position.

7 Claims, 10 Drawing Figures

FIG. 4D
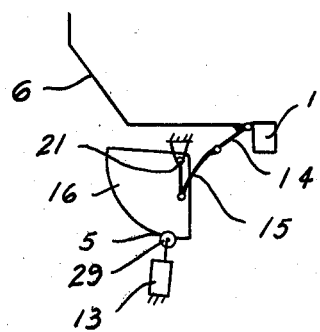
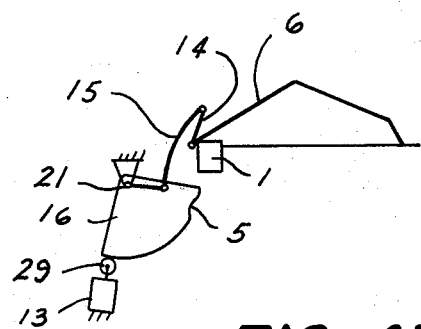
FIG. 4E

OPERATOR SAFETY DEVICE

BACKGROUND OF THE INVENTION

The present invention relates to an operator safety device for a machine, particularly for a printing press.

It is known in the prior art to provide at least some parts of a printing press with covers for protecting an operator against contact with these parts when the machine is in operation. Usually, some of these covers are movable between a closed position in which they cover the corresponding parts of the press and an open position where the covers do not cover the parts and the latter are readily accessible for the operator. However, some of the covers may move to their open positions (for one reason or another) when the press is in operation. In this case, the uncovered parts of the press may constitute a potential danger of accidents.

It is known in the prior art to shut down the press immediately after a cover moves into its open position, by means of a safety device. The safety device includes a plurality of end switches.

The specific task is to protect the operator's narrow passage path between two adjacent presses. The operator's passage path is provided with a plurality of separate covers.

In this case each cover is provided with a switch (i.e., electrical switch) so that once a cover moves in any direction from a predetermined working position the electric circuit system of the machine becomes influenced (see French Pat. No. 2,247,349).

Such an arrangement is very expensive (since it is necessary to provide each cover with a switch and a corresponding electric circuit) and rather unreliable (since the switch becomes actuated even due to a simple misuse of the safety device by the operator, for example due to an inadvertent pressure on the cover by the operator). These shortcomings make the safety device completely inefficient. Besides, breaking of a spring may lead to switching the machine on even when the covers are in their open positions with all undesirable and dangerous consequences.

It is also known to provide a safety device with a so-called interlock switch. The cover of this device is provided with a control cam (fixedly mounted on the cover) which is pivotable about an axis so as to actuate a switch to correspondingly shut down the machine (see British Federation of Master Printers "Safety in Print", 1367, p. 22). Such an arrangement can not be installed in the operator passage path between two adjacent printing presses.

SUMMARY OF THE INVENTION

It is a general object of the present invention to avoid the disadvantages of the prior art safety devices.

More particularly, it is an object of the present invention to provide such an operator safety device which excludes any operation of a machine when at least one cover is open.

Another object of the present invention is to provide an operator safety device which is actuated once at least one cover is open regardless of whether the movement of the cover to the open position thereof has been contemplated or not.

Still another object of the present invention is to provide an operator safety device for an operator passage path between adjacent machines covered with a double-cover system.

In pursuance of these objects and others which will become apparent hereafter, one feature of the present invention resides in providing a plurality of covers for covering parts of the machine to protect an operator against contact with these parts when the machine is in operation. At least some of the covers are displaceable between a first position in which they cover said parts of the machine and a second position in which said some covers do not cover said parts and the latter are readily accessible and constitute a potential danger of accidents. There is provided a switch operable for shutting down the machine when at least one of said some covers moves from said first into said second position. A single linkage is operatively connected with said some covers for actuating said switch whenever at least one of said some covers moves from said first into said second position.

In accordance with a preferred embodiment of the present invention a single linkage includes a number of levers each connected to the corresponding one of said some covers on the one hand and on the other hand each lever is operatively connected with a common cam so as to pivot the latter in response to movement of at least one of said some covers from said first into said second position. The cam in its turn is force locked to said switch so as to actuate the same in response to movement of at least one lever.

The plurality of covers includes covers located in the operator's passage path between two adjacent machines (i.e., printing presses). These covers include a front cover which is located immediately between the adjacent machines and/or a main cover located between a feeding mechanism and a first machine (in a row of machines) and/or between a receiving mechanism and a last machine (in the same row of machines). The front cover is advantageously operatively connected to said main cover. Both covers are operatively connected (i.e., through a corresponding linkage) with the common cam for displacing the same in response to movement of at least one cover.

In accordance with another advantageous feature of the present invention the front cover is fixedly connected with a regulating lever which is movable along a rolling cam (i.e., a rolling surface). The main cover is operatively connected by means of a linkage with the movable common cam and the cam is force locked to the switch so as to actuate the latter.

The rolling cam constitutes a curved switching surface, that is, when the corresponding lever rolls along a first predetermined portion of this curved switching surface, the switch becomes actuated and shuts down the machine. The curved switching surface is provided with a second predetermined portion. When the lever rolls along the second predetermined surface the machine is still in operation.

Still another advantageous feature of the present invention resides in providing an additional side cover which is connected to another cam by means of the linkage. The other cam is located on the same axis as said common cam and is also force locked to the same switch so as to actuate the latter in response to movement of said additional side cover. The front cover and the main cover may be connected to each other by means of a four levers drive. In this case any movement of the main or front cover is transmitted onto the regulating cam via an intermediate cover.

The front cover may be connected to the regulating cam (i.e., common cam) by means of a chain or any other similar means of transmitting movement of one element to another.

Thus, the safety device in accordance with the present invention actuates (i.e., shuts down) the machine whenever at least one (or a few) covers move into the open position so that the machine parts to be protected become readily accessible and constitute a potential danger of accidents. In accordance with the present invention an operator does not have to bother with shutting down the machine manually before he opens a cover or when he notices that at least one cover moves into the open position. The operator safety device will automatically shut down the machine immediately after at least one cover is open.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 4A-4E show different positions of the operator safety device shown in FIG. 2;

DESCRIPTION OF THE PREFERRED EMBODIMENTS

Figure 1:
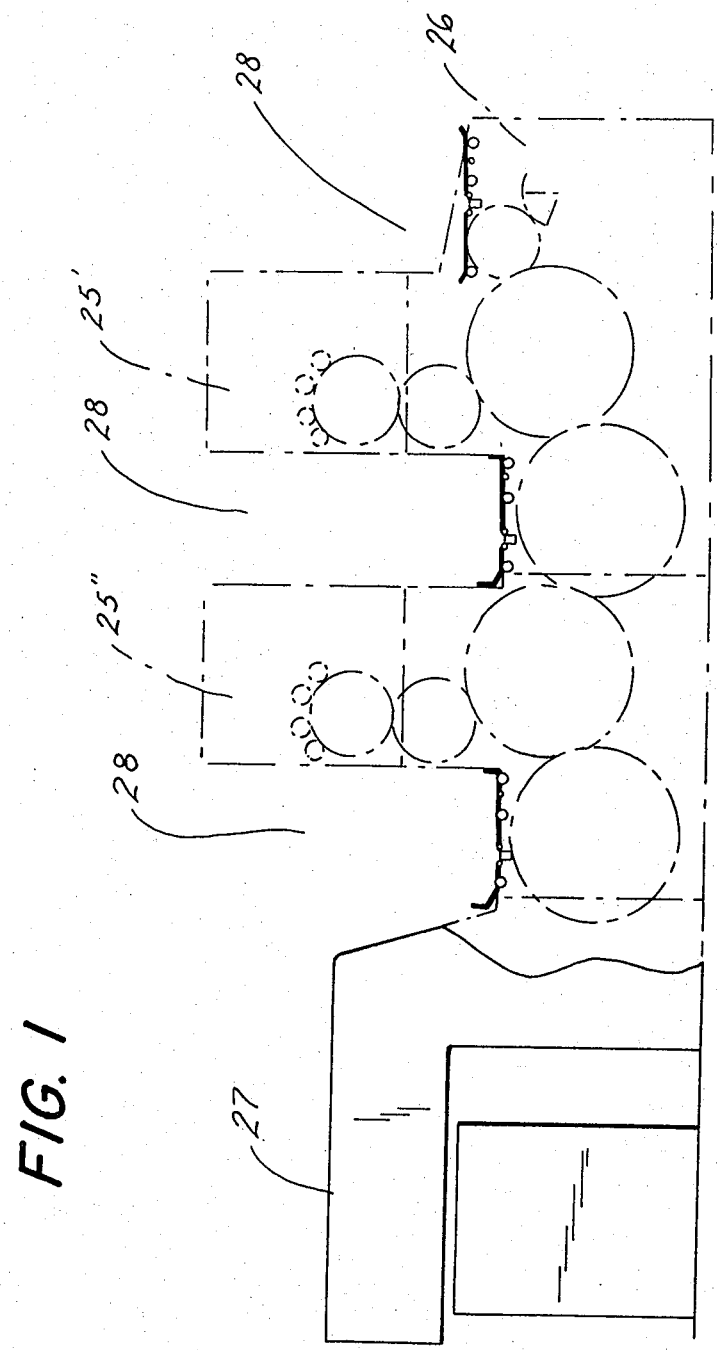
FIG. 1 is a schematic view of a printing press provided with an operator safety device in accordance with the present invention.

Referring now to the drawings and first to the FIG. 1 thereof, it may be seen that the reference numeral 25' designates one printing press and the reference numeral 25" designates an adjacent printing press. A feeding mechanism 26 is located on the right hand (FIG. 1) of the printing press 25' and a discharging mechanism 27 is located on the left hand of the printing press 25". Between the printing press 25' and 25" there is located an operator footpath 28. Similar footpaths 28 are located between the printing press 25' and the feeding mechanism 26, and between the printing press 25" and the discharging mechanism 27, respectively. The footpaths 28 are covered by covers so as to protect the operator from direct contact with movable parts of the presses 25' and 25" and mechanisms 26 and 27 at least when the presses are in operation. The covers simultaneously serve as a gangway for the operator. An operator safety device, including covers, is shown in detail in FIGS. 2, 3, 4, 5 and 6.

Figure 2:
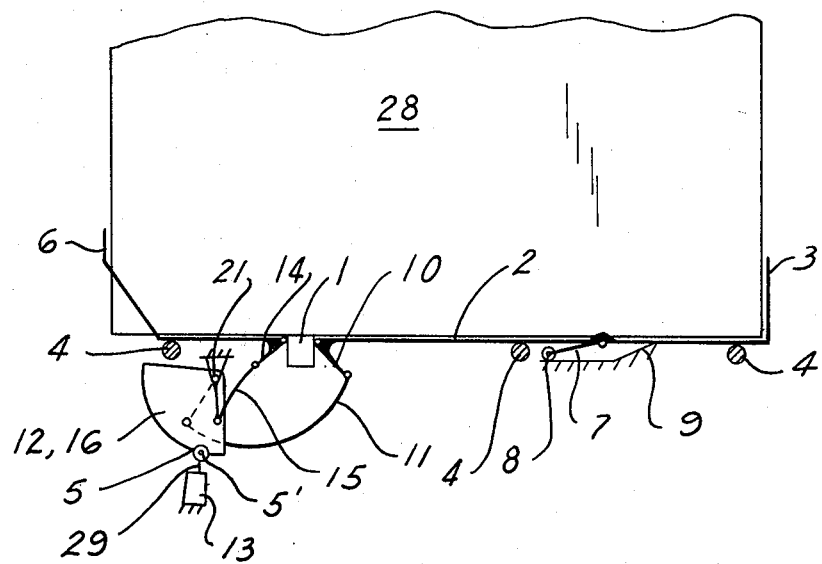
FIG. 2 is a schematic view of the operator safety device.

Thus, FIG. 2 shows a traverse 1 which is provided with a pivotable main cover 2 which is in its turn rotatably connected with a first side cover 3. The main cover 2 and the side cover 3 are located at both sides between the presses side walls on pins 4. A second side cover 6 is also rotatably mounted on the traverse 1. The first side cover 3 is fixedly connected to a steering lever 7 which carries on its end a roller 8. The roller 8 is located in a plane of a rolling surface 9. The main cover 2 is fixedly connected with a lever 10 which is linked with a couple 11 which in its turn is linked with a steering cam 12. The double cover (i.e., covers 2 and 3) is movable between a closed position where it covers the corresponding parts of the presses and an open position where the double cover does not cover these parts and the latter are readily accessible and therefore constitute a potential danger of accidents.

The cam 12 is provided with a recess 5 engageable with a roller 5' fixedly mounted on a push rod 29 of a switch 13. When the double cover 2 and 3 is in the closed position the switch 13 is not actuated. In other words the roller 5' is snapped in the recess 5 of the cam 12.

The second side cover 6 is fixedly connected with an intermediate lever 14 which is linked with an intermediate couple 15. The couple 15 is operatively linked with a steering cam 16. The cam 12 and the cam 16 pivot about the same axis 21.

The roller 5' of the push rod 29 of the switch 13 snaps into both recesses 5 of the cams 12 and 16, respectively.

The second side cover 6 is movable between a closed and an open position, which are similar to those described with reference to the double cover 2 and 3. Thus, when the side cover 6 is in the closed position the roller 5' is snapped in the corresponding recess 5 of the cam 16 and the switch is not actuated. Once the side cover 6 moves by a predetermined angle from the closed into the open position the cam 16 pivots correspondingly and the roller 5' jumps out of the recess 5 and runs along the curved surface of the cam 16 to thereby move the push rod 29 and actuate the switch 13. Thus, the printing press 13 shuts down.

The covers 2, 3 and 6 may be of different cross-sections. However, these covers may be of the same, for example a flat, cross-section.

Figure 3:
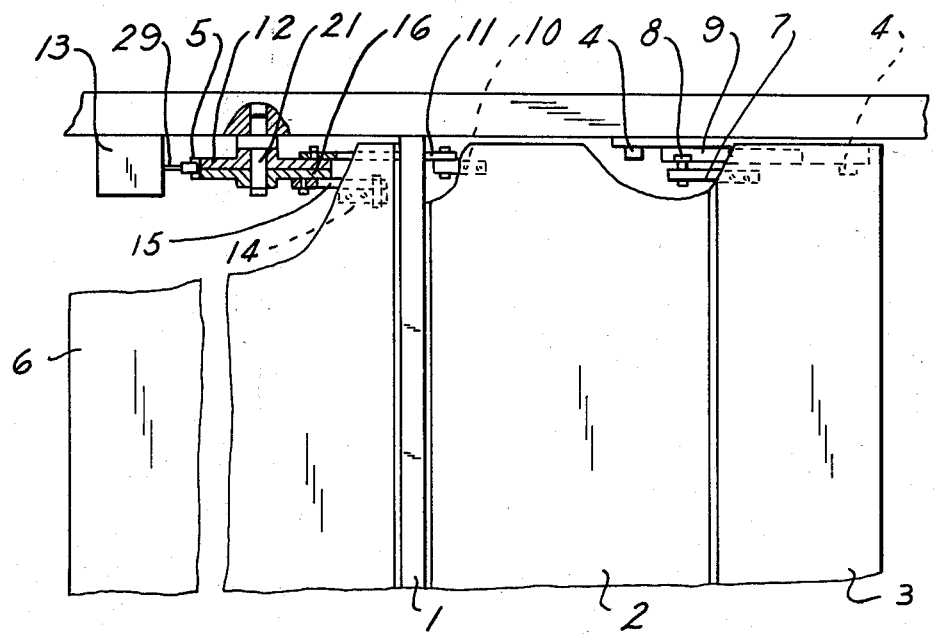
FIG. 3 is a top view of the operator safety device shown in FIG. 2.

FIG. 3 shows a top view of the arrangement shown in FIG. 2.

Figure 4A:
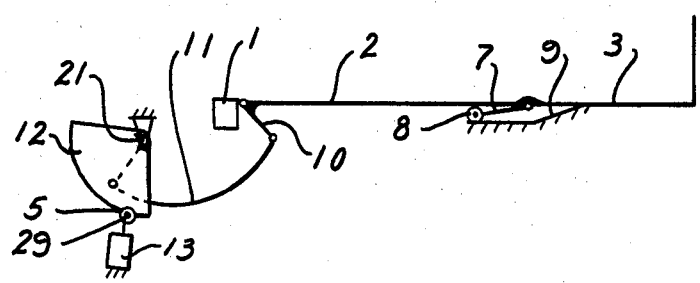
Figure 4B:
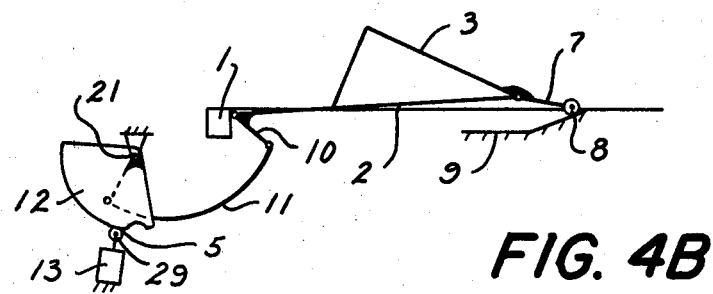
Figure 4C:
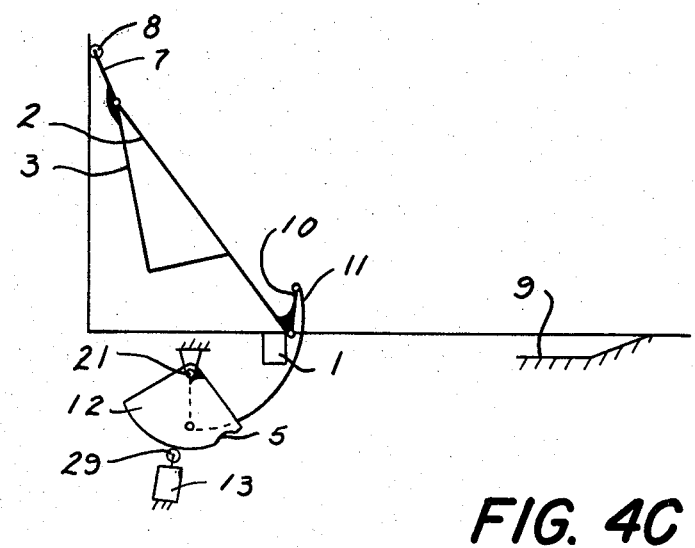

FIG. 4 shows different positions of the arrangement shown in FIGS. 2 and 3. More particularly, FIG. 4 shows different positions of the covers 2, 3 and 6 and corresponding different positions of the cams 12 and 16.

A position 4A shows the covers 2 and 3 in the closed position. Should the first side cover 3 move from its closed position into its open position (position 4B) then the steering lever 7 displaces correspondingly, guiding the roller 8 along the rolling surface 9 to thereby lift slightly the main cover 2. A four bar linkage (consisting of the lever 10, couple 11 and the steering cam 12) moves in a different position so that the push rod 29 of the switch 13 is pressed during rotation of the steering cam 12. By pressing the push rod 29 the switch 13 becomes actuated and the printing press is shut down completely or switched over to a minimal number of revolutions. Should the covers 2 and 3 be lifted together (position 4c) then the four bar linkage (the lever 10, the couple 11 and the steering cam 12) pivots the steering cam 12 even further so that the push rod 29 of the switch 13 remains pressed against the switch 13. The side cover 6 remains closed in a position 4D. When the side cover 6 is pivoted in a position 4E the four bar linkage (the lever 14, the couple 15 and the steering cam 16) pivots the steering cam 16 so that the push rod 29 of the switch 13 becomes pressed against the switch 13. In other words the cover 6 by its movement from the closed position 4D into the open position 4E actuates the switch 13 independently of the respective positions of the covers 2 and 3 and the printing press is shut down.

Figure 5:
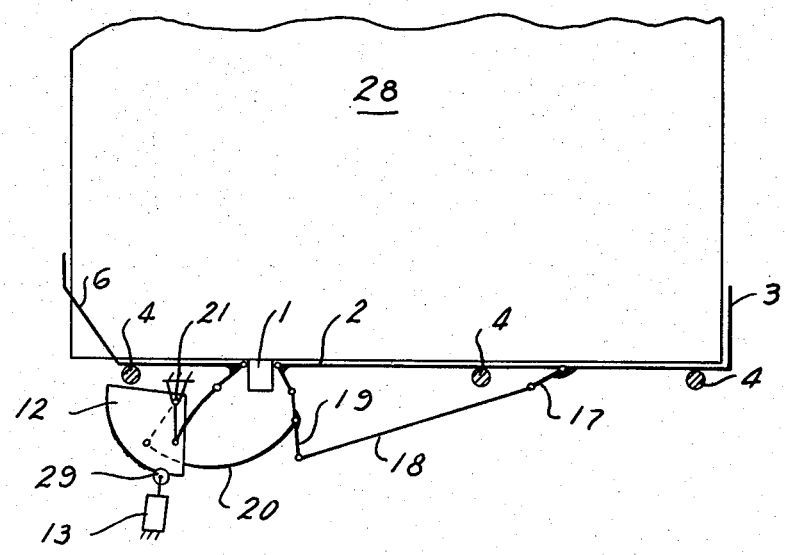
FIG. 5 is a schematic view of another embodiment of the operator safety device.

FIG. 5 shows another embodiment of the operator safety device slightly different from that shown in FIG. 2. The four bar linkage includes in the case of the embodiment shown in FIG. 5 an operative lever 17, an operative couple 18, a two arm rocking lever 19, an intermediate couple 20 and the steering cam 12. In response to displacement of the first side cover 3 the steering cam 12 is pivoted by means of two four bar linkages connected to each other so as to press the push rod 29 of the switch 13 to thereby shut down the printing press. Should the covers 2 and 3 be lifted together the steering cam 12 is pivoted further via the four bar linkage (the rocking lever 19, the intermediate couple 20 and the steering cam 12) so that the push rod 29 of the switch 13 remains pressed against the switch 13.

Figure 6:
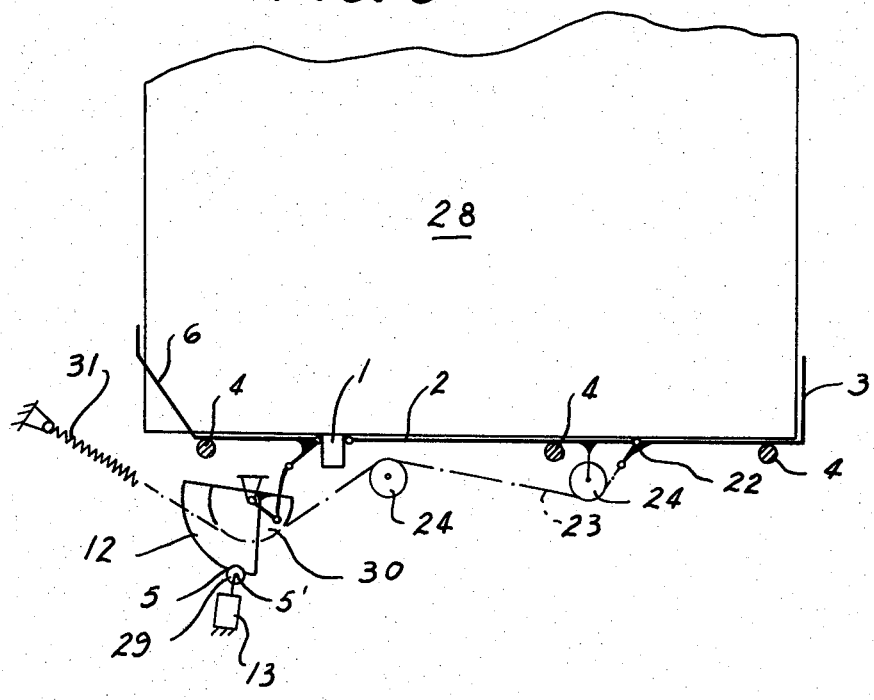
FIG. 6 is a schematic view of still another embodiment of the operator safety device.

FIG. 6 shows a third embodiment of the operator safety device. In response to displacement of the first side cover 3 the steering cam 12 will pivot via a switch lever 22, a chain 23 movable through guide rollers 24 and a chain segment 30. The angular displacement of the steering cam 12 will lead to movement of the roller 5' and actuation of the push rod 29 and the switch 13. Should the covers 2 and 3 move further together the cam 12 will pivot further and the push rod 29 will remain pressed against the switch 13.

A spring 31 is adapted to tighten the chain 23 in the corresponding positions of the covers 2 and 3.

The push rod 29 of the switch 13 is provided in the conventional manner with a spring (not shown for the sake of simplicity of the drawings) which urges with its biasing force the push rod 29 and the roller 5' in a direction towards the cams 12 and 16. Due to the biasing force of this spring the roller 5' snaps into the corresponding recesses 5 of the steering cams 12 and 16. Should this spring become broken the printing press is shut down immediately.

The above described operator safety device is operative when at least some power (i.e., force) is applied to the covers 2, 3 and 6. Should there be no force applied to the covers 2, 3 and 6 the printing press will not be shut down by the present operator safety device.

It is to be understood that the operator safety device is not limited exclusively to printing presses. Obviously such a safety device may be used for any machines whenever it is necessary to protect an operator against contact with parts of a machine when the latter is in operation.

It will be understood that each of the elements described above, or two or more together, may also find a useful application in other types of operator safety devices differing from the types described above.

While the invention has been illustrated and described as embodied in an operator safety device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An operator safety device for a printing press having at least two parts defining a footpath therebetween, comprising a supporting traverse arranged across said footpath, a double cover including a main cover and a first side cover, said main cover being hinged at one side thereof to said traverse and at the opposite side to said first side cover, a second side cover hinged to said traverse opposite said main cover, said covers being rotatable between a first position in which they cover said parts and a second position in which said parts are exposed, a rotatable switching cam arranged under said covers and defining a recess in its periphery, a switch having a movable control rod springbiassed against said switching cam, said switch being in its closed state when said rod engages said recess and in its open state when said rod disengages said recess, linking means coupled between each of said covers and said switching cam to rotate the same into a position in which said control rod engages said recess when all covers are in said first position and to disengage said rod from said recess when at least one of said covers is moved from said first into said second position.

2. A device as defined in claim 1, wherein said linking means includes a steering lever fixedly connected to said first side cover for movement therewith; and further including guiding means for guiding said steering lever along a predetermined surface in response to movement of said first side cover.

3. A device as defined in claim 2, wherein said guiding means include a rolling surface of a predetermined configuration and a roller fixedly mounted on said steering lever and adapted to roll along said rolling surface in response to movement of said first side cover between said positions.

4. A device as defined in claim 3 wherein said linking means further include a first four-bar linkage for operatively coupling said second side cover to said switching cam.

5. A device as defined in claim 4, wherein said linking means includes an additional four-bar linkage operatively arranged between said main cover and said cam for pivoting the latter in response to movement of at least one of said main and first side covers.

6. A device as defined in claim 5 wherein said linking means further includes a two-arm rocking lever, and coupling means for transmitting movement of said steering lever to said additional four-bar linkage.

7. A device as defined in claim 5 wherein a chain transmission is provided between said steering lever and said switching cam to rotate the latter when said steering lever is actuated.

* * * * *